United States Patent [19]
Younis et al.

[11] Patent Number: 6,047,391
[45] Date of Patent: Apr. 4, 2000

[54] METHOD FOR STRONG PARTITIONING OF A MULTI-PROCESSOR VME BACKPLANE BUS

[75] Inventors: Mohamed F. Younis, Columbia; Jeffrey X. Zhou, Ellicott City, both of Md.

[73] Assignee: Honeywell International Inc., Morristown, N.J.

[21] Appl. No.: 08/939,943

[22] Filed: Sep. 29, 1997

[51] Int. Cl.[7] ................................................. G06F 11/00
[52] U.S. Cl. .................................................... 714/47
[58] Field of Search ............................... 714/43, 44, 47; 370/220, 216

[56] References Cited

U.S. PATENT DOCUMENTS

| | | | |
|---|---|---|---|
| 5,204,864 | 4/1993 | Won | 714/43 |
| 5,329,630 | 7/1994 | Balwin | 711/173 |
| 5,581,600 | 12/1996 | Watts et al. | 379/88.02 |

FOREIGN PATENT DOCUMENTS 0 676 697 A1   3/1995   European Pat. Off. .

OTHER PUBLICATIONS

Brand, et al, Message Protocol Unloads VMEbus Processors, EDN Nov. 9, 1989, pp. 255–258.

Mackenna, et al; Backup Support Gives VMEbus Powerful Multiprocessing Architecture, Electronic Components and Applications, vol. 6, No. 3, 1984; pp. 178–185.

Hoyme, K, et al, SAFEbus™, IEEE/AIAA 11th Digital Avionics Systems Connference, Oct. 5, 1992, pp. 68–73, Seattle, WA.

Younis, M.F., et al, Strong Partioning Protocol for a Multiprocessor VME System, Fault Tolerant Computing Symposium, Jun. 23, 1998, pp. 176–185, XP002093185, Munich, Germany.

*Primary Examiner*—Robert W. Beausoliel, Jr.
*Assistant Examiner*—Pierre Eddy Elisca
*Attorney, Agent, or Firm*—Loria B. Yeadon

[57] ABSTRACT

A method for strong partitioning of multi-processor applications that maintains fault containment on the VMEbus is presented. The method implements a message passing mechanism to increase fault tolerance and localize and contain detected faults on any one card connected to a VMEbus. Software implementation supports message-based inter-module communications using the available features provided by the VME cards. A portion of each VME card's global memory is allocated upon initialization for supporting the message passing mechanism. Access to the message buffer is restricted to read-only for modules that do not own that buffer. An error detection or correction code (e.g. cyclic redundancy check) is appended to the end of a data stream message to contain faults and prevent their propagation to other VME cards.

21 Claims, 6 Drawing Sheets

METHOD FOR STRONG PARTITIONING OF A MULTI-PROCESSOR VME BACKPLANE BUS

BACKGROUND OF THE INVENTION

1. Field of the Invention

The invention relates to VMEbus systems. More particularly, it relates to a method for functionally partitioning multi-processor applications to increase fault tolerance of the VMEbus.

2. Prior Art

The use of digital computer systems has become very common in mission critical applications such as flight control. In such applications, it is essential not only to ensure correct semantics, but also to provide fault tolerance capabilities.

Advancements in technology have enabled the avionics industry to develop new design concepts which result in highly-integrated software-controlled digital avionics. The new approach, referred to as Integrated Modular Avionics (IMA), introduces methods which can achieve high levels of reusability and cost effectiveness compared to earlier implementations of avionics. See "*Design Guide for Integrated Modular Avionics*", ARINC report 651, Published by Aeronautical Radio Inc., Annapolis, Md., November 1991. The IMA approach encourages partitioning and using standardized building blocks in building environmental and functional components of avionics. Strong functional partitioning facilitates integration, validation and FAA certification. Following the IMA guidelines, the cost of both development and maintenance is expected to decrease because of mass production of the building blocks, lower levels of spares, and reduced certification costs.

The backplane bus is one of the most important components in Integrated Modular Avionics. While many backplane bus designs have been proposed, only a few are actually used. Selecting the backplane bus is affected by many design and engineering factors, such as performance, reliability, and fault tolerance. Although, such issues are very important to ensure certain level of safety of commercial jet aircraft and high availability of military aircraft, the cost of the bus and associated line replaceable modules (cards) is a major concern.

Most of the currently available dependable backplane bus systems are very expensive and are supplied by very few vendors, such as ARINC 659. See, "*Backplane Data Bus*", ARINC Specification 659, Published by Aeronautical Radio Inc., Annapolis. Md. December 1993. Thus, a need exists for an affordable bus system that provides the required levels of dependability and complies with the IMA design methodology. The VMEbus system is a prime candidate because it is both rigorously defined and widely supported. "*IEEE Standard for a Versatile Backplane Bus: VMEbus*", std 1014–1987, Published by the Institute of Electrical and Electronic Engineers, New York, N.Y. March 1988. In addition, expanding selections of VMEbus boards and vendors guarantee competitive prices and continuous support. Moreover, the VMEbus offers an open architecture that facilitates the integration of multiple vendors' boards. This feature makes the VMEbus the ideal choice for integrated avionics.

The VMEbus allows multi-processing, expandability, and adaptability for many designs and processors. It handles data transfer rates in excess of 40 Mbytes/sec using parallel data transfer. However, the VMEbus does not include error detection or correction bits associated with the transmitted data. The VMEbus is asynchronous and non-multiplexed, and as such, no clocks are used to coordinate data transfer. Data is passed between modules using interlocked handshaking signals where cycle speed is set by the slowest module participating in the cycle. Using asynchronous protocol in the VMEbus provides reasonable capabilities to integrate products from various vendors.

The VMEbus provides support for multiprocessing using shared memory. To avoid inconsistency while updating shared memory, read-modify-write bus cycles are used. The read-modify-write cycle allows updating shared memory and prevents race conditions. A master-slave architecture is used in the VMEbus. Modules (i.e, cards or boards) can be designed to act as master, slave or both. Before a master can transfer data it must first acquire the bus using a central arbiter. Although the VMEbus does provide reasonable compatibility to integrate products from various vendors, fast parallel data transfer, and a wide support by many manufactures, fault tolerance in VMEbus based systems is very limited.

The VMEbus relies on all connected modules (cards or boards) for detecting and reporting faults on a specific failure control line. Thus, VMEbus modules are expected to have on-board firmware diagnostics to detect faults. The time for data transfer is monitored by the VMEbus master (i.e., the sender). If the receiver does not acknowledge the message, the master times out the data transfer and re-transmits. However, the bus provides neither error detection nor correction for the transferred data. There is no redundancy in either the transmission lines or the transferred data on the bus. Generally, the built-in-test and transmission time-out provides limited fault coverage for permanent faults only. The shared memory model used by the VMEbus for multiprocessing makes the modules tightly coupled, and in the absence of message verification, faults can and do propagate from one module to the others. Thus, errors cannot be contained within the faulty module (card or board) and can jeopardize the behavior of the entire system.

Strong partitioning of modules is one the most important IMA requirements which the VMEbus lacks. The multiprocessing in the VMEbus using a shared memory mechanism allows faults in one module to cause errors in other non-faulty modules by writing to their memories.

It is clear from the foregoing that the VMEbus needs enhancements to strengthen its fault tolerance capabilities, and specifically in containing faults and recovery from failure. Because low cost is an important feature of the VMEbus, enhancing the fault containment capabilities should avoid changing the design and the layout of the currently available cards. Changing the design of a VME card will not only require reengineering and revalidation, which increase the manufacturing cost, but will also limit the number of vendors who agree to do the modifications. Thus, the preservation of the current hardware design of the cards is highly desirable.

SUMMARY OF THE INVENTION

It is therefore an object of the present invention to enhance functionality and overcome the fault tolerance inefficiencies in VMEbus systems and make them more suitable for avionics.

Yet another object of the invention is to modify VMEBus system operation to increase accuracy of transmitted data and maintain compliance with the IMA partitioning guidelines.

In order to improve the fault containment in a VMEbus system, the present invention proposes a two step approach where the first step involves validating the inter-module data transfer, and the second step eliminates the propagation of faults from one module to another through the use of shared memory. The cost effectivness of the VMEbus imposes contraints on the hardware implementation of the VME cards, and thereby prevents an efficient hardware solution for an increased fault tolerant system.

In an illustrative embodiment of the invention an error detection code (e.g. cyclic redundancy check) is to be appended to the end of a data stream. The code can be generated by the message transmission module within the operating system kernel. The software-generated error detection code eliminates the need for card redesign. Since the error detection/correction code will potentially reduce the efficiency of the data transfer on the bus and consequently the performance, it may be possible, through the operating system kernel, to dynamically select either to append error detection or error correction codes according to the length of the transmitted data. The receiver module validates the data using the error detection/correction code before committing and acting upon that received data.

In order to achieve increased fault tolerance, a message passing mechanism is implemented into the existing memories of the VME modules (cards or boards), which mechanism validates the data transfer from one VME board to another and prevents the propagation of faults to other VME boards connected to the VMEbus. The method supports message-based inter-module communications using the available features provided by the VME cards and still detects errors and prevents fault propagation.

To support the message passing mechanism, a global message buffer in each VME board connected to the VMEbus is to be declared and dedicated for these messages only. The message buffer will be the only globally visible memory of each module connected to the VMEbus. Contrary to the existing VME operation, other VME boards connected to the bus will not be allowed to access the memories of other boards except for their dedicated message buffers. In addition, access to a message buffer is restricted to read-only for boards (modules) that do not own that buffer. This read only restriction eliminates the potential for fault propagation. If a master board wants to send data to a slave, it simply writes a message for the slave into the master's message buffer. The slave is notified as to the presence of the message, and reads that message from the master memory and reacts accordingly.

A specific message format can be imposed that contains the data to be sent, sender ID, receiver ID, error detection or correction code, and a message unique ID (if necessary). Error detection and correction encoding as performed by the sender of the information. The slave (receiver) will check the contents of the master's message before reacting to it. The receiver can then detect addressing errors in the message by verifying the sender ID and receiver ID information. In addition, transmission errors can be detected or recovered using the information redundancy in the form of the error detection or correction code in the message.

Synchronization can be achieved either by polling the message buffer of the sender for the required message, or by using the address monitoring feature provided by the VMEbus to interrupt the receiver as soon as a message is being written by the sender in the designated address. The message ID can be useful to overcome race conditions if the receiver tries to read the message before it is ready, which may be is possible if the VMEbus has a higher priority than the local bus. The message buffer can be partitioned for various boards and slaves will be assigned a unique location for their messages. The adopted application execution-synchronization mechanism is a designer decision.

Using this technique, errors in the sender can be isolated and prevented from propagation to the receiver. A fault in the sender may affect the receiver only through the generated message. Errors in the message can be either in data, sender ID, receiver ID, Message ID, or message format. The receiver should be able to detect errors in the message body by validating the message format, error detection code, sender ID and the receiver ID. The message ID can be checked to guarantee the right message sequence. Any error in the message detected by the receiver will invalidate the entire message and a recovery action will be taken.

An addressing fault in the receiver that may cause it to read from the wrong card, or the wrong address within the right card, will affect the message format and the sender ID. Furthermore, the mapping of message buffers of cards in the global address space of the VME system should be widely distributed so that an addressing error cannot change a valid global address into another valid address. Maintaining a suitable hamming distance can guard the system against permanent or transient failure of one or more address bits. Thus, the system will be functionally partitioned, and faults can be contained within the faulty module and will not affect other modules.

The message passing mechanism can be entirely implemented by software. The constraints of hardware change in the VME cards makes a software implementation the more attractive alternative. In fact, it is further contemplated to use commercial-off-the-shelf (COTS) operating systems by extending the kernel service to include message handling.

In addition, the generation and validation of the error detection code within the message can be included in the message handler. Thus, the applicability of the fault containment techniques depends on the feasibility of partitioning local memory and mapping the message buffer within the VME global address space.

In an illustrative embodiment of the invention, the VMEbus can be partitioned with fault isolation capabilities to comply with the IMA specifications. Errors can be contained using the proposed message passing protocol. Messages can be verified with respect to sender and receiver IDs as well as the message version (ID). In addition, information redundancy in the form of error detection and correction code can be provided within the message, to verify the data transmission over the bus.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
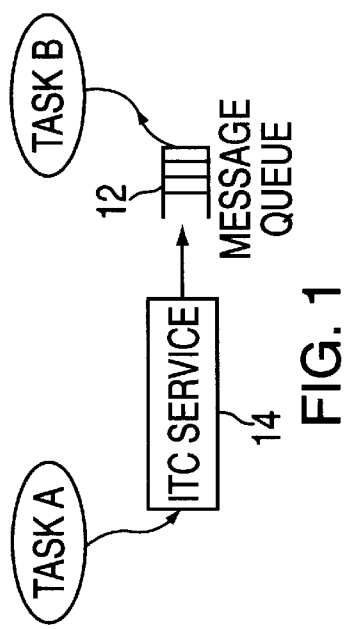
FIG. 1 is a schematic representation of message passing in a uniprocessor system.

FIG. 1 shows a single processor system in which tasks may establish communication with each other through the use of message queues. A message queue is an abstraction of a unidirectional channel, and is typically identified by a "queue ID" or QID. Two communicating tasks use the same QID to exchange messages. The delivery of the messages is handled by the Inter-Task Communication (ITC) Service 14 (typically part of the operating systems kernel's library functions) which may maintain several message queues 12 depending on how many communication channels are open. The ITC Service takes care of synchronization issues such as the mutually exclusive access to the message queue.

Figure 2:
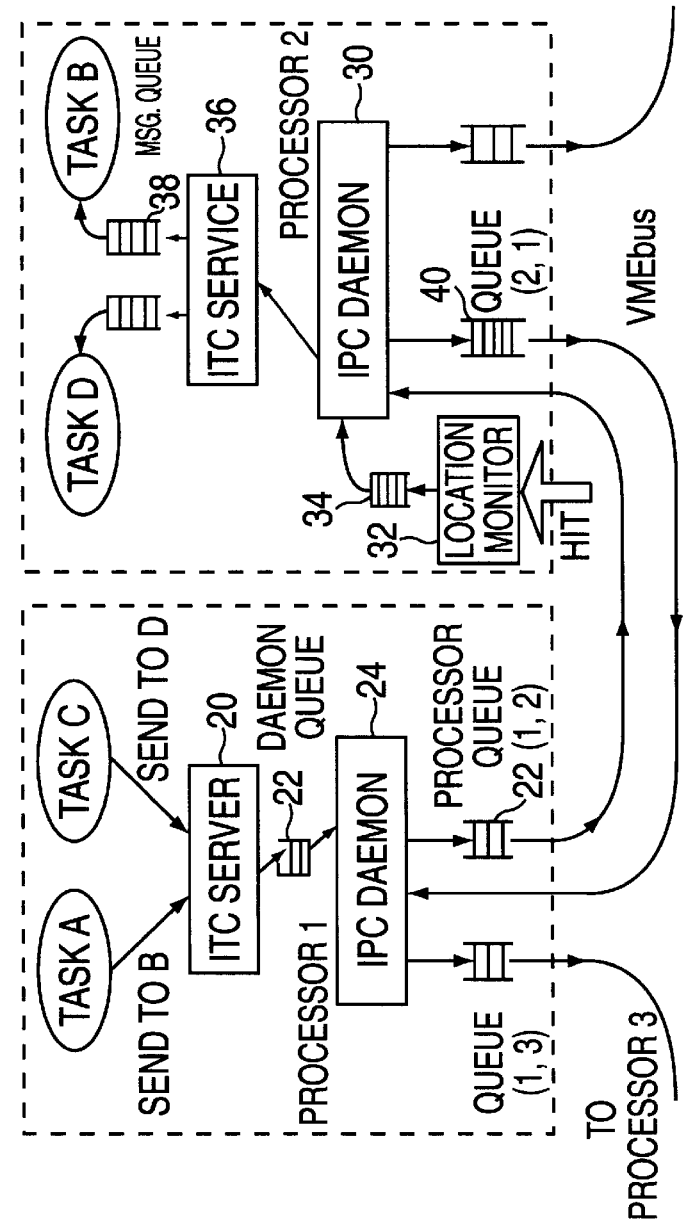
FIG. 2 is a schematic representation of the message passing mechanism implemented in a multi-processor VMEbus system according to an illustrative embodiment of the invention.

FIG. 2 shows the implementation of the message passing mechanism in the multiprocessor VMEbus structure according to the invention. In order to achieve fault containment within a faulty board, the inter-processor communication (IPC) over a VMEbus backplane is to be accomplished through message queues. An IPC daemon is charged with maintaining these queues. The IPC daemon is an independent task created by the system at initialization to handle inter-processor communication. Each board dedicates a portion of its memory as a globally addressable read-only memory (global message buffer) where it will leave outgoing messages for other processor boards to read. For each (sender, receiver) permutation of processor boards, there is a processor queue which is created within the global portion of the sender's main memory to hold any messages sent to that specific receiver by any task running on the sender board. Receivers have read-only privilege on their dedicated processor queues owned by other processors.

For example, when task A on processor 1 needs to send a message to task B on processor 2, it contacts the local ITC service 20 on processor 1, which recognizes that the target queue belongs to an external processor. Therefore, the message to be sent is inserted in the IPC daemon queue 22. The IPC daemon 24 on processor 1 processes the buffered message by appending it to the processor queue 26 associated with processor 2. Processor 2's IPC daemon 30 is then notified that it has a message waiting inside processor 1. This kind of notification takes the form of hitting the location monitor 32 on the recipient board. In order to "hit" the location monitor of the receiving board, processor 1 loads an address of the specified location monitor onto the bus. Location monitor detects this address on the bus and initiates the location monitor routine. The location monitor routine sends a message 34 to IPC daemon 30 announcing that there is a message ready for delivery at processor board 1. The IPC daemon 30 on processor 2 fetches the message from processor queue 26 of board 1 and notifies the IPC 24 of processor 1 after successful completion. At that time, the IPC 24 of processor 1 deletes the message from its processor queue 26. Meanwhile, IPC 30 on processor 2 delivers the received message to the ITC 36 which finally stores the message in the message queue 38 connected to Task B (this is a regular message queue maintained by the operating system). An example of an operating system could be VxWorks, which is an operating system readily available for VME cards (modules), and is used here as an example of a real time operating system. Any other suitable known queue operated by a real time operating system could also be employed without departing from the scope of the invention.

It is worth noting that the ITC on each processor still handles local inter-task communication as discussed with reference to FIG. 1. It only contacts the IPC if the target receiver is on a different processor. Even though there may be multiple communication sessions established between any two processors, there are only two processor queues carrying the communication; one queue for each direction. The sizes of the daemon queue and the processor queues depend on the amount of available memory and the expected communication traffic density.

The operation of the fault-tolerant unidirectional communication protocol to establish communication among different processor boards on the VMEbus has two main phases: the initialization phase and the steady state phase.

Initialization Phase

It is assumed that the developer of the distributed system has full knowledge of all the inter-processor communication activities in the system (i.e. which tasks will engage in any sort of send/receive activities), and on which processor board these tasks will run. This information shall be written in a board-specific configuration file read by every board at initialization. As part of the configuration file of each board, the following information concerning each inter-task communication channel is provided: the name of the queue associated with each recipient task; and the board ID where the recipient task will be running.

Figure 3:
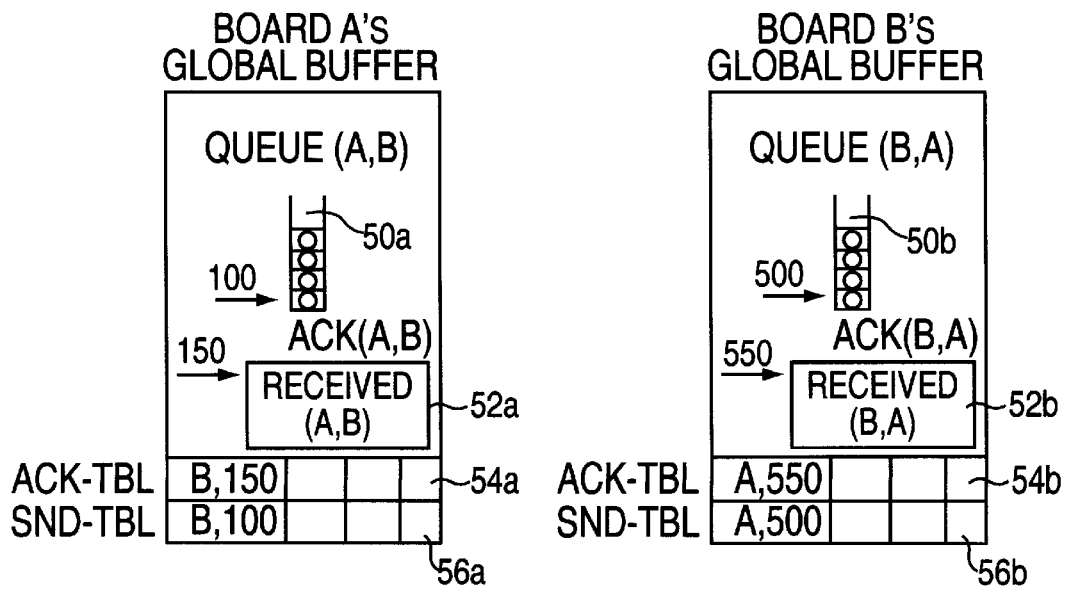
FIG. 3 is a block diagram showing an example of the global message buffers of two VMEbus boards according to an illustrative embodiment of the invention.

At boot up, each board reads its configuration file and initializes its own global buffer. The global buffer contains a processor queue 50a–50b, as well as an acknowledgment cell 52a–52b for each of the other boards to which it may send messages. FIG. 3 shows an example of the global buffers of two boards A and B. The processor queues 50 are used to send messages, while the acknowledgment cells 52 are used to acknowledge the successful arrival of a message. Each board needs to have full knowledge of the location of the processor queues and the acknowledgment cells of all boards it expects to communicate with during its normal operation. The acquisition of such information depends on how and when these data structures are created. There are two possible methods to create the processor queues and the acknowledgment cells. They can be created at run time and their locations are not known until then, or they can be mapped, at compile time, to absolute memory addresses in each board's global buffer.

The first approach of creating at run time is more flexible and is readily automated. However, it requires exchanging information on the location of the processor queues and the acknowledgment cells at the initialization phase of a board. In avionics applications, a static approach is preferable for increased predictability and certification of the products. For this reason, the second approach is employed even though it requires extra effort by the system designer to manually allocate the memory to each processor queue and acknowledgment cell. Utilities that will help automate this kind of pre-allocation at compile time can be developed and implemented without departing from the scope of the invention.

Once the processor queues are initialized, the board can immediately move to the steady state mode of operation.

The following is a discussion of how the board, and the whole system, will be initialized in the case when the first approach for creating the above mentioned data structures is applied. This discussion is provided for designing a system with no redundant boards.

Initialization Phase with Dynamic Memory Allocation

In the case when the processor queues and the acknowledgment cells are dynamically created at run time, or even if we can not determine their physical memory location until then, another initialization mechanism must be implemented. Referring to FIG. 3, the locations of the processor queues are written in a table called the Send Table (SND-TBL) 56, which is also located inside the board's own global message buffer. The SND-TBL contains an entry for each candidate recipient board and contains the following information for each processor queue: the ID of a recipient board; and the address (inside the sender's own global buffer) of the queue where the sender board will leave any messages directed to that recipient. For example, SND-TBL 56a includes an entry "B,100" which indicates the ID of the recipient (receiver) board (i.e., board B), and the address "100" of the dedicated board B processor queue 50a within board A's global message buffer where it is to leave messages for board B to retrieve. The purpose of the SND-TBL is to inform each recipient board where it can pick up its messages.

As mentioned previously, each board will also create an acknowledgment cell 52 associated with every board from which it expects to receive messages. The memory addresses of these cells, which are also within the board's global address space, are written in a globally accessible table called the acknowledge table (ACK-TBL) 54. Each entry in this table consists of the ID of the sender board and the address (inside the receiver's own global buffer) where the sender can check for the acknowledgment. ACK-TBL 54a has an entry of "B,150" which represents the ID of sender board B and the address location of board A's acknowledgement cell 52a dedicated to board B. The purpose of the ACK-TBL is to inform each sender board where it may look for the acknowledgment to messages they have sent to the receiving board.

Both the SND-TBL and the ACK-TBL are created at the initialization of the board and remain unchanged throughout the operation of the system. The location of both tables should be known to all other boards. There are two approaches to accomplish this:

1) Create the SND-TBL of each board at the memory address (BID-xxxx), where BID is the ID of the owner board, and the xxxx portion of the address is the same for all boards. A similar approach is used to create the ACK-TBL; or 2) Create both tables at any address convenient to the owner board and store this information as part of the configuration files of all other boards.

The second approach is preferred because it provides more flexibility by not imposing strong restrictions on the memory size of any one board.

After creating the processor queues 50 and constructing both the SND-TBLs 56 and the ACK-TBLs 54, the board will notify all boards with whom it expects to establish communication in the future. This notification can take the form of hitting the location monitors on those boards. The board cannot proceed to the steady state mode of operation until it receives response from all the boards it has just notified. If the board times out waiting for a confirmation response from any one board, it may assume that the latter is defective, in which case the system cannot operate properly, and corrective action will be required by the system operator.

On the other hand, when a board, for example board A, is notified by board B during system initialization, assuming they have both finished creating their SND-TBL and ACK-TBL tables, both boards will exchange those entries of the SND-TBL and ACK-TBL tables in which they reference each other. Once a board gets response from all boards it expects to communicate with, it can then proceed to the steady state mode of operation.

Steady State Operation Phase

As stated earlier, each module (card) or processor board on the VMEbus dedicates a portion of its on-board memory as a read-only global message buffer accessible to all other boards on the bus. The owner of the global message buffer is the only board that may write to this buffer. Each board will create a processor queue associated with each of the other boards to which it is willing to send messages. It will also create an acknowledgment cell for each board from which it may receive messages. Referring to FIG. 3, Queue (A,B) 50a denotes the queue created by board A in its own global buffer area to handle all messages sent from board A to board B. Ack(B,A) 52b is the acknowledgment cell where board B writes the ID of the last message successfully received from board A. In order to send a message from board A to board B, the following actions will take place:

Board A inserts the message to be sent to board B in Queue(A,B) 50a, and notifies B that it has a message waiting. Board B reads the message directly from Queue (A,B) without actually removing it from that queue. On successful delivery, board B acknowledges the receipt of the message by writing the message ID into Ack(B,A) 52b. Meanwhile, board A will poll the value stored in Ack(B,A) 52b until it finds the ID it expects. Once board A finds the message ID in the acknowledgment cell, it removes the message from Queue(A,B) 50a and prepares to send another message to B, if any.

The global buffer of each board is structured as follows:

```
typedef struct {
    /* one processor queue for each of the other board */
    ProcessorQueue pQue[NUM_BOARDS-1];
    /* As well as one acknowledgment cell for each of the other boards */
    MSG_ID       ack[NUM_BOARDS];
} BoardGlobalBuffer;
```

Each board maintains a separate ProcessorQueue for each board to which it may send messages, and maintains an acknowledgment cell 52 for each board from which it expects to receive messages. For example, processor queue 26 of processor 1 is for sending messages to processor 2, and processor queue 40 of processor 2 is designated for sending messages to processor 1 (FIG. 2).

Steady State Operation of the IPC daemon

Figure 4:
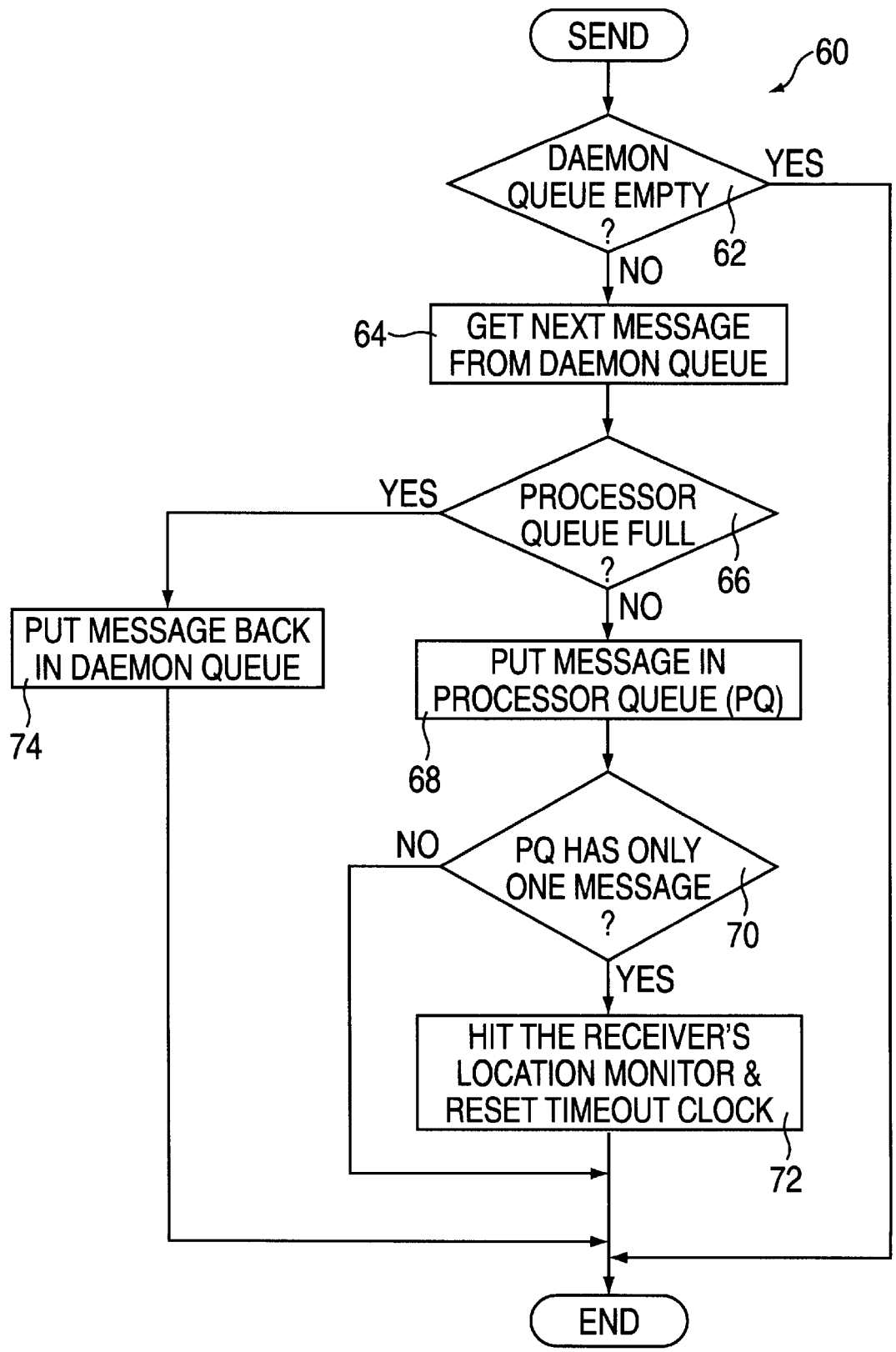
FIG. 4 is a flowchart of the SEND procedure of the message passing mechanism.
Figure 5:
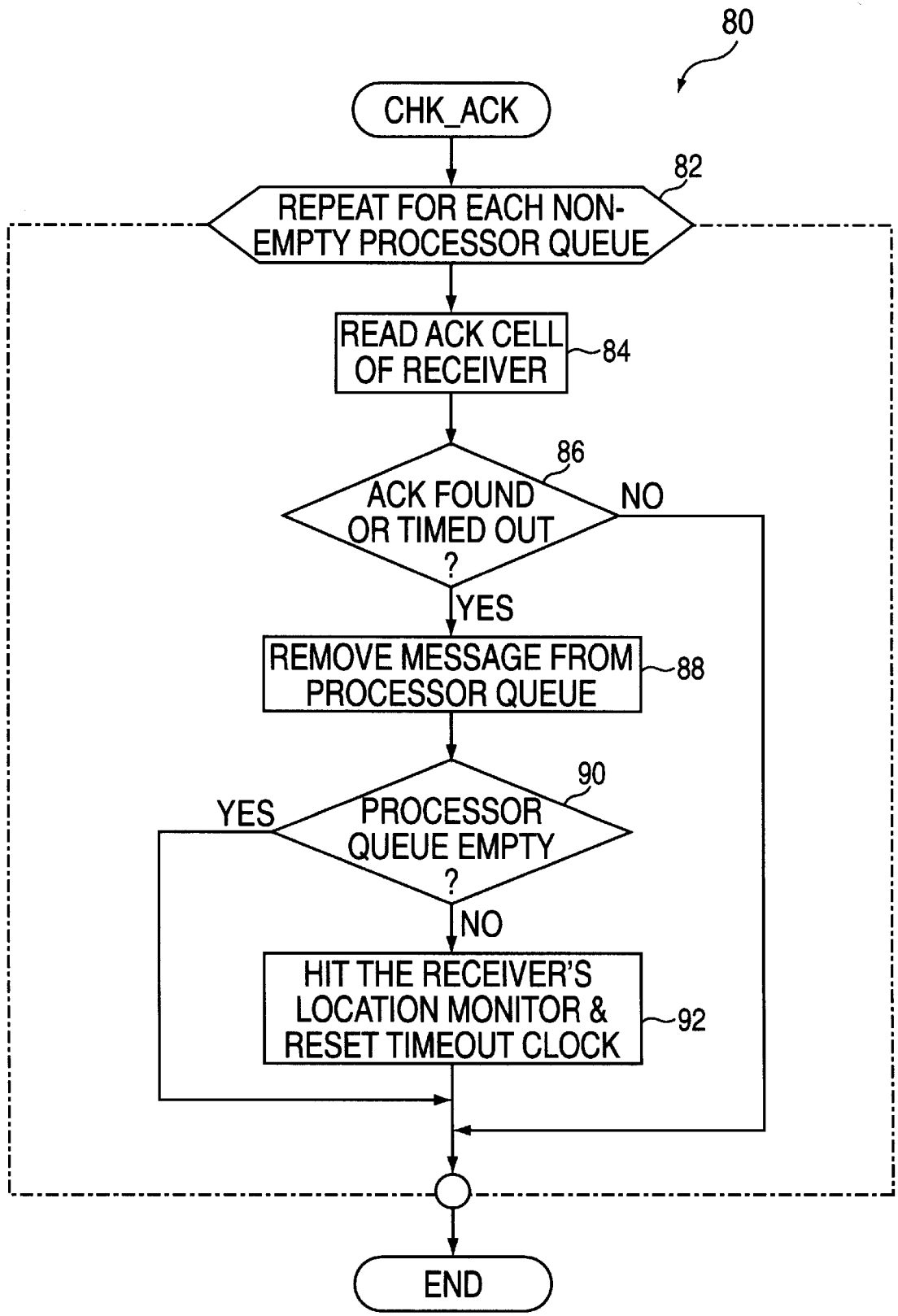
FIG. 5 is a flowchart of the Acknowledgment check procedure of the message passing mechanism.
Figure 6:
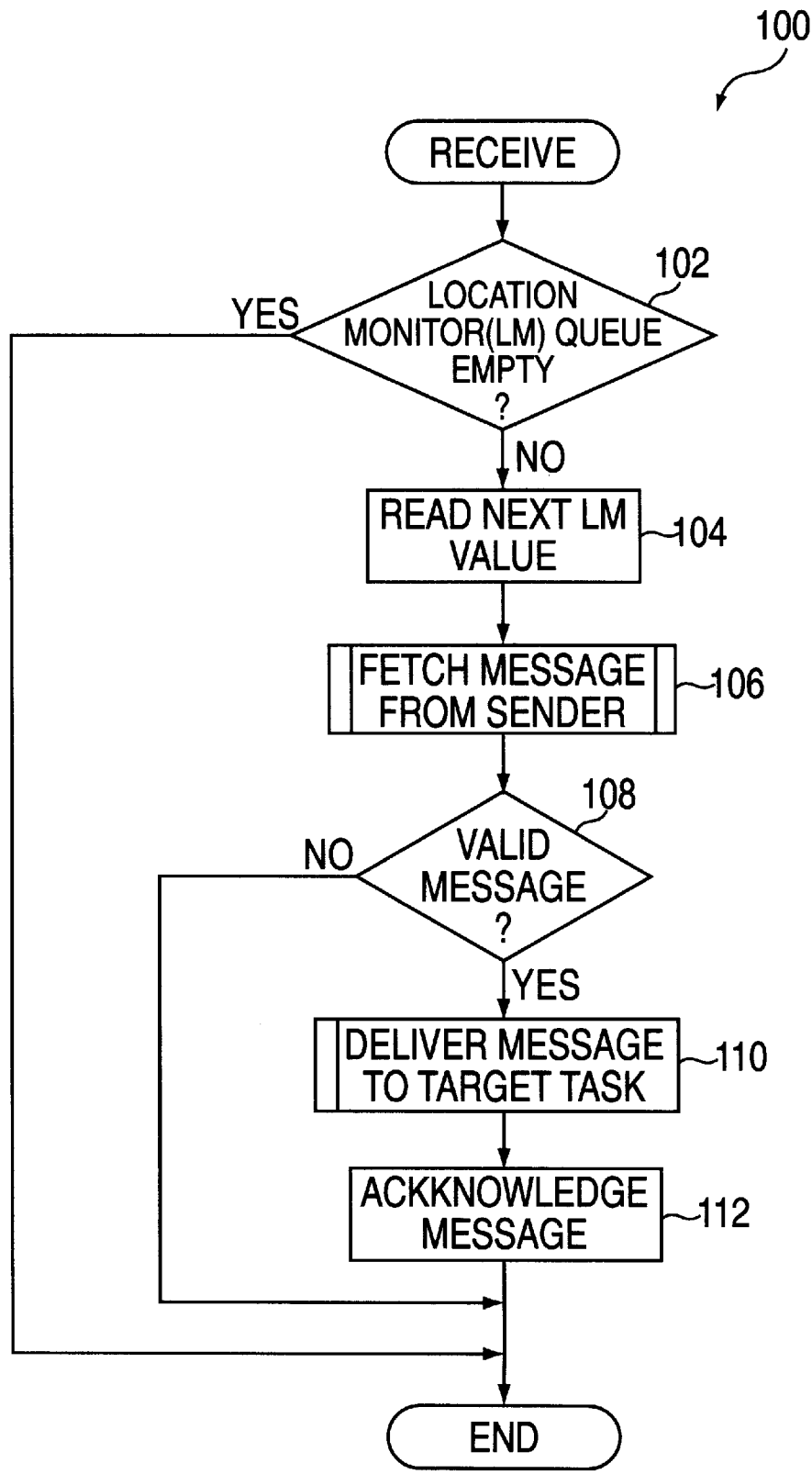
FIG. 6 is a flowchart of the receive procedure of the message passing mechanism.

FIGS. 4–6 show the three functions that the IPC daemon on each board connected to the VMEbus performs periodically. Referring to FIG. 4, the SEND operation 60 starts with a determination as to whether the daemon queue of the sending board is empty (step 62). If not, the next message from the daemon queue is retrieved at step 64. If the daemon queue is empty, the SEND procedure ends. After retrieving the next message (step 64) it is inserted into the processor queue associated with the receiving board (step 68). In the event that the processor queue is full (step 66), the IPC daemon inserts the message back at the tail of the daemon queue. In order to avoid the possibility that the daemon queue becomes full before the IPC daemon can reinsert the message, a counting semaphore is used with an initial value of one less than the actual number of buffers in the daemon queue. The ITC service decrements the semaphore before inserting any new messages into the daemon queue. On the other side, the IPC daemon increments the semaphore after successfully moving the message into the proper processor queue. Once inserted in the proper processor queue at step 68, a determination is made as to whether the processor queue has only one message (step 70). If only one message exists, the receiver's location monitor is hit, and a timeout clock is reset (step 72). Each recipient board should only be notified once as a new message arrives at the head of the processor queue. The notification is accomplished by hitting the location monitor of that recipient board. If more than one message exists in the processor queue at step 70, the process is terminated. The check for one message in the processor queue (step 70) is implemented to optimize the bus usage. If more than one message is present in the processor queue, that indicates that the recipient board has not yet provided an acknowledgement message in its acknowledgment cell for the sender board. Without the acknowledgement of safe receipt, the sender will time out waiting for it. The acknowledgement check is described with reference to FIG. 5.

FIG. 5 shows the flowchart of the CHK_ACK routine, which checks the acknowledgment cells of each board to which a message has been sent, but not yet acknowledged. The ACK cell of the receiver is read to determine if there is an acknowledge message contained therein (step 84). If the acknowledgment is found (step 86), or the sender times out waiting for the acknowledgment, that message is removed from its processor queue (step 88). If the acknowledgement is not found, and the sender times out, this is an indication that the receiver board may contain a fault. The sender will, however, continue to attempt to send future messages to the same recipient. The rationale for this action is that the receiving board may not be faulty, and may have been rebooted and thus can still receive messages in the future even though it lost some in the past. If the lack of acknowledgement continues, the receiver board is faulty, and corrective action would be required. The processor queue is then checked (step 90) to determine if any messages are remaining to be delivered. If the queue is empty, the routine terminates and is repeated for each non-empty processor queue (step 82). If the processor queue is not empty, the respective receiver's location monitor is hit, and the timeout clock is reset (step 92).

FIG. 6 shows the RECEIVE routine 100. The RECEIVE routine starts with a check to determine if the Location Monitor (LM) queue of the receiving board is empty (step 102). If it is empty, the routine terminates. If the LM queue is not empty, the next LM value is read (step 104). This reading is performed by checking for other location monitor interrupts on the bus line. After reading the LM value, the receiver can then fetch the message from the sender (step 106). Once the message is retrieved, the receiver makes a determination as to whether the message is valid (step 108). If the message is invalid for any reason, the receive routine terminates. If the message is valid, it is delivered to the target task within the receiver (step 110). After delivery to the target task, the receiver generates an acknowledgment message (step 112) for the sender to retrieve from the receiver's acknowledgment cell.

Figure 7:
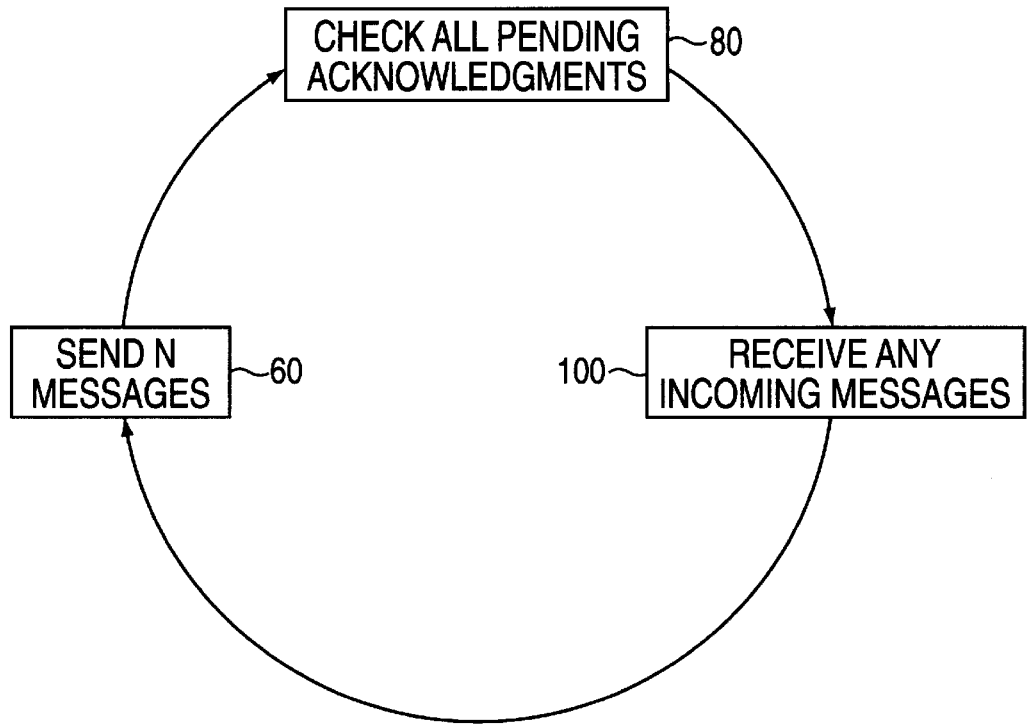
FIG. 7 is a block diagram showing the message passing procedure according to an illustrative embodiment of the invention.

FIG. 7 shows the cyclic or circular manner in which these routines are performed. In each cycle, the SEND function 60 will be repeated N times, where N is the number of processor queues in the sending board's global buffer. If the messages are evenly distributed over the processor queues, then each of the N queues will get one message, on the average, during each cycle of the IPC daemon operation. Each board will repeatedly send its messages 60, check for all pending acknowledgements 80, and then receive any incoming message 100.

Board Configuration File

As mentioned previously, each board will load a configuration file at boot time (initialization). This file is structured as follows:

```
typedef struct {
    BoardID            myID;
    BoardGlobalBuffer  * bgb[NUM_BOARDS];
    ULONG              * LocMon[NUM_BOARDS];
    queue_info_type    ITCtable[MAX_MSG_QUEUES];
} ConfigurationTable;
```

The 'myid' field contains the board ID assigned to this specific board. Therefore, each board has an identification number as soon as it boots up. The 'bgb' array contains pointers to the global buffers of all processor boards on the bus. The 'LocMon' array contains address pointers to the location monitors of all boards. The ITCtable holds information on all inter-task message queues referenced in the running application. Both the ITC Service and the IPC daemon to handle inter-processor messages use this ITCtable. Each entry in this table is structured as follows:

```
typedef struct {
    char          name[MAX_Q_NAME];
    MSG_Q_ID      q_id;
    BoardID hostBoard;
} queue_info_type;
```

For each ITC message queue, 'name' represents the queue name used by the communicating tasks to send and/or receive messages. 'q_id' is the queue ID assigned to this queue by the operating system and is only known at runtime.

Finally, 'hostBoard' is the board ID where this message queue resides.

One example of a VME card that can be configured according to the illustrative embodiments described is the Motorola MVME162LX embedded controller. This controller provides capabilities for software configurable global addressing of the on-board memory of a module. There are software configurable map decoders that can be used to control the global addressing of the VME boards' local resources. Such a feature allows the restriction of addresses used by the other cards. There are alternate registers that can be used to overwrite the 16 most significant bits (MSB) of the address and consequently restrict access from the other cards to only 64KB of local memory. This 64KB can be contained and used as a message buffer.

To prevent the possibility of other cards reading by mistake from the wrong card, one may use different combinations for the MSB for each card so that the hamming distance will be more than 1 bit. Thus, we can guarantee that cards cannot read from the wrong card unless there is more than one transmission error. Given that the number of cards is limited (maximum 22 according to the IEEE standard (See, *"IEEE Standard for a Versatile Backplane Bus: VMEbus"*, std 1014–1987, Published by the Institute of Electrical and Electronic Engineers, New York, N.Y. March 1988.), it is possible to achieve a distance of at least 8 bits between card addresses and to isolate up to 8 simultaneous errors. Reading from a non-existing card will be timed out by the VMEbus and can be detected. Errors in the least significant 16 bits of the address can be detected by validating the messages. Reading from a different location within the sender message buffer will contain neither the right format nor the correct message semantic.

Inter-task Communication Messages

Each task that expects to receive messages must create an operating system message queue and share the name of this queue with all tasks from which it may receive a message. All messages directed to a specific task will be stored in the real time operating system message queue from which that task can read those messages. The sender task shall call the ITC Service, which is then charged with inserting any new messages in the proper queue. These queues can be implemented using the operating system message queue library. The inter-task messages will have a free format implemented as an array of characters with no more than MAX_MSG_SIZE bytes (The interface to the ITC Service will be similar to that provided by the operating system's message queue library). It is up to the communicating tasks to interpret the structure of the message.

As mentioned earlier and referring to FIG. 2, if the ITC Service 20 realizes that the target queue 38 is physically located on another processor board, it relays the message to the IPC daemon 24. Communication between the ITC Service 20 and the IPC daemon 24 is established by means of a special message queue called the daemon queue 22. The ITC Service 20 leaves all outgoing messages in the daemon queue 22, where they are later handled by the IPC daemon 24. The daemon queue 22 is to be implemented as an operating system POSIX message queue in which messages are prioritized according to the priority of the sender task. The layout of each daemon queue messages is given by the ITCmsg class shown below:

Inter-processor Messages

The IPC daemon will process the messages left by the ITC Service in the daemon queue and format them as Inter-Processor Communication messages. Each IPC message is stored in the processor queue 26 associated with the target processor board. The processor queue will not be implemented as an operating system message queue since it has to be handled differently. Each queue will be implemented as an array of MAX_PQ_MSGS nodes, each representing one inter-processor communication message buffer.

```
typedef struct {
    BoardID   sender, receiver;
    IPCnode   node[MAX_PQ_MSGS]; /* Statically allocated buffers */
    IPCnode * free ,              /* List of free buffers */
            * head,              /* Message currently at the head of the queue */
            * tail,              /* Message currently at the tail of the queue
    */
    int            numMsgs;           /* in all priority values */
    unsigned long  timestamp;         /* Used to timeout acknowledgments */
} ProcessorQueue;
```

Figure 8:
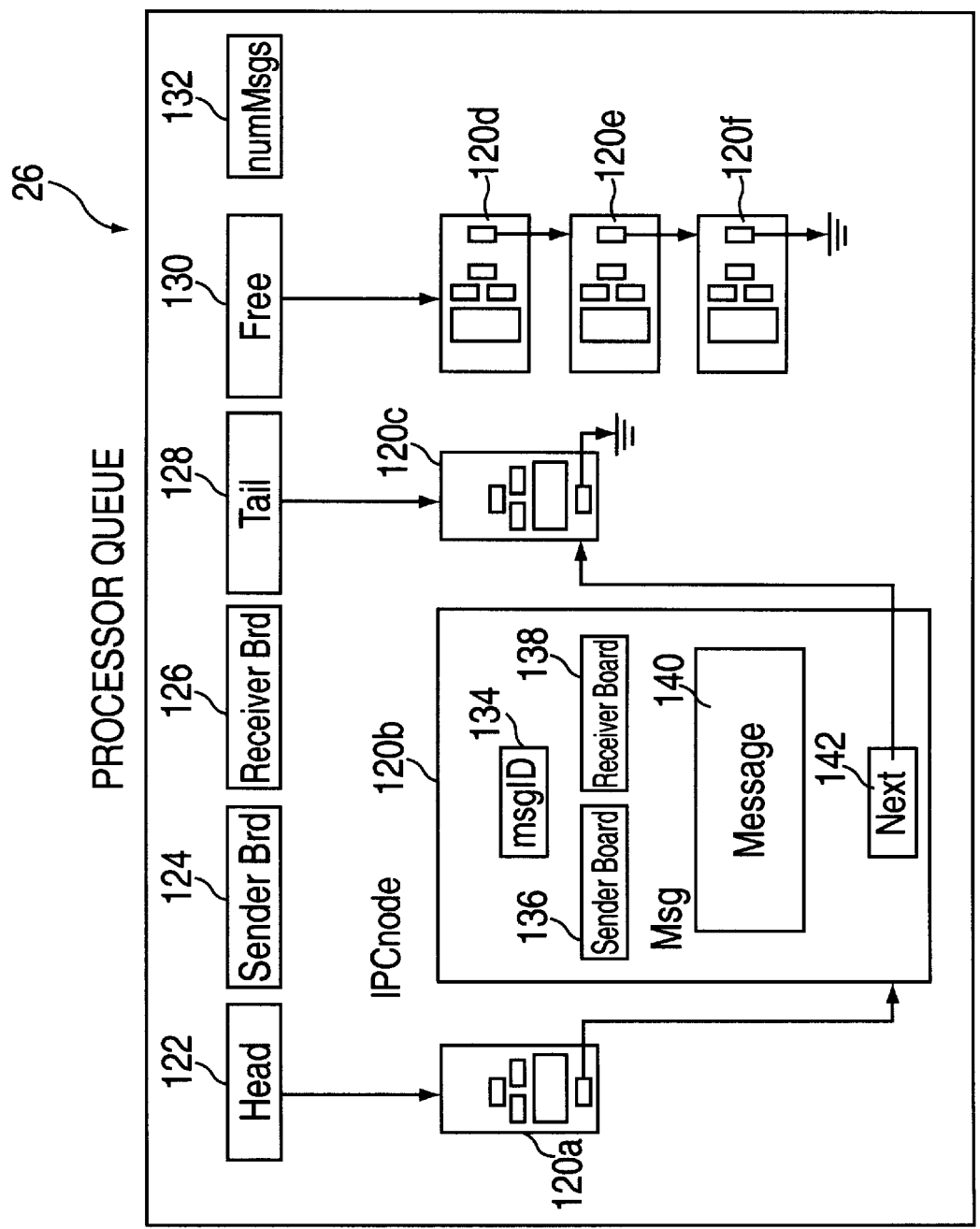
FIG. 8 is a block diagram representation of the processor queue in the message passing mechanism according to an illustrative embodiment of the invention.

Referring to FIG. 8, an example of the layout of processor queue 26 is shown. A group of headers or identifiers 122, 124, 126, 128, 130, and 132 provide all information relating to the queues current status. For example, identifier 122 provides information indicating which message is currently at the head of the queue, and identifier 128 indicates the message that is at the tail of the queue. Identifiers 124 and 126 provide information relating to the sender and receiver communicating boards, respectively, associated with this processor queue. Identifier 130 provides a list of free buffers within the queue, and identifier 132 provides information relating to the size of the queue and the number of messages contained therein. The processor queue 26 includes a number of IPCnodes or buffers 120a–120f for inter-processor communication. IPCnode 120b has been enlarged to show the information contained therein. Each IPCnode includes

```
typedef struct {
    // The structure of one inter-task message
    BoardID   receiver;                         /* Receiving board */
    UINT      tskPriority;                      /* Priority of sender task */
    Message   msg;
} ITCmsg;
typedef struct {
    char    Qname[MAX_Q_NAME];    /* Name of the Target Queue */
    UCHAR   text[MAX_TASK_MSG_SIZE]; /* body of the message */
    UINT    length;                  /* num of bytes in message
    */
    int     msgPriority;             /* Priority of Delivery */
    UINT    checksum;                /* Error Detection Code */
} Message;
```

The ITC Service 20 makes a copy of the inter-task message into the 'text' array. The 'msgPriority' field represents the priority of the message as set by the calling task. It is worth noting that this priority only affects the order of delivery to the receiving task, i.e. messages with high 'msgPriority' will be inserted at or near the front of the receiving queue. However, it does not affect in any way the allocation of system resources to handle this message.

the identification information relating to the sender 136 and receiver board 138. The message to be sent to the receiver board is contained in field 140, and the msgID field 134 is used to write the acknowledgment by the receiver board. The next field 142 links this message to a subsequent message when there is not sufficient space within one IPCnode (buffer). IPCnodes 120d–120f are grouped under the free node identifier 130. For simplicity, the free queue nodes 120d–120f will be maintained as a LIFO (Last In First Out) stack. Each element in the 'node' array is structured as follows:

```
typedef struct {
    /* Layout of one node in the IPC message queue */
    IPCnode * next;    /* Double links */
    BoardID sender, receiver;    /* Communicating boards */
    MSGID           msgID;    /* Used for acknowledgment */
    Message msg;    /* The inter-task message */
} IPCnode;
```

The 'msgID' can be implemented as an unsigned 32-bit integer whose value is incremented for each message sent from this board, and appropriate utility functions are to be provided to insert and/or remove entries from the processor queue.

It should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. A method for containing faults on a VME backplane bus having a plurality of VME boards connected to the VMEbus and each having a memory, the method comprising the step of:
   integrating a message passing mechanism into the VME board memories which validates inter-processor communication on the VMEbus and prevents the propagation of faults from one VME board to another without modification of the VME boards, said step of integrating comprising the steps of:
   dedicating a portion of memory in each board connected to the VMEbus as a global message buffer for these messages- only, access to each global message buffer being restricted to read only for boards that do not own that global message buffer; and
   configuring each global message buffer with information relating to inter-processor communications.

2. A method for containing faults on a VMF backplane bus having a plurality of VME boards connected to the VMEbus and each having a memory, the method comprising the step of:
   integrating a message passing mechanism into the VME board memories which validates inter-processor communication on the VMEbus and prevents the propagation of faults from one VME board to another, said step of integrating comprising the steps of
   dedicating a portion of memory in each board connected to the VMEbus as a global message buffer; and
   configuring each global message buffer with information relating to interprocessor communications, said step of configuring comprising the steps of
   allocating a processor queue in the global message buffer of each board for each receiver board it expects to communicate with, the processor queue being accessible only by its dedicated receiver board; and
   allocating an acknowledgment cell in the global message buffer of each board for each sender board it expects to communicate with, the acknowledgement cell being accessible only by its dedicated sender board.

3. The method according to claim 2, wherein said steps of allocating the processor queue and acknowledgement cell are performed at compile time prior to run time and mapped to absolute memory addresses in each board's global message buffer.

4. The method according to claim 2, wherein said steps of allocating the processor queue and acknowledgment cell are dynamically performed at run time.

5. The method according to claim 2, further comprising the steps of:
   formatting a message to be sent to a task on another VME board;
   sending the message to a the VME board; and
   acknowledging the safe receipt of the sent message.

6. The method according to claim 5, further comprising the step of receiving a sent message at the intended receiver board.

7. The method according to claim 6, wherein said step of receiving a sent message further comprises the steps of:
   checking the contents of a location monitor on the receiver board;
   checking for the presence of other location monitor interrupts;
   retrieving the message from the receiver's processor queue on the sender board when a location monitor interrupt is present;
   determining if the message retrieved is valid; and
   placing an acknowledgment within the sender's dedicated acknowledgment cell on the receiver board when a valid message is retrieved.

8. The method according to claim 7, further comprising the step of identifying an error in the sender board when the message retrieved has been determined to be invalid.

9. The method according to claim 5, wherein said step of formatting a message further comprises the steps of:
   providing the sender board identification information;
   providing the receiver board identification information; and
   adding an error detection or correction code to the message.

10. The method according to claim 9, further comprising the steps of adding a message identification code to the message.

11. The method according to claim 5, wherein said step of sending the message further comprises the steps of:
    placing the message to be sent in the processor queue dedicated to the receiver board;
    notifying the receiver board that a message is in its processor queue; and
    resetting a timeout clock for obtaining the acknowledgment of safe receipt of the sent message from the receiver board.

12. The method according to claim 11, wherein said step of placing the message to be sent in the receiver processor queue further comprises the steps:
    determining if a daemon queue within the sender board contains any messages to be sent;
    obtaining the next message in the daemon queue when a message to be sent is present;
    determining if the processor queue dedicated to the receiver of the current message is full;
    inserting the message into the processor queue dedicated to the receiver board when the processor queue is not full; and
    re-inserting the message into the daemon queue when the processor queue dedicated to the recipient board is full.

13. The method according to claim 11, further comprising the step of indicating a fault in the receiver board when the reset timeout clock times out waiting for an acknowledgment.

14. The method according to claim 5, wherein said step of acknowledging the safe receipt of the message further comprises the steps of:

reading the sender's dedicated acknowledgment cell within the receiver board; and removing the message from the receiver processor queue within the sender board when an acknowledgment has been detected.

15. The method according to claim 2, wherein said step of allocating a processor queue and acknowledgment cell further comprises the steps of:

creating a send table within the global message buffer of each VME board, the send table including an entry for each potential receiver board, and for each processor queue, the entry for each processor queue including the identification of the receiver board and the memory address of the processor queue within the sender board's global message buffer dedicated to the identified receiver;

creating an acknowledgment table within the global message buffer of each VME board, the acknowledgment table including an entry for each sender board it expects to receive a message from, each entry including the identification of the sender board, and the memory address of the acknowledgment cell within the receiver board's global message buffer dedicated to the identified sender board; and notifying all receiver boards with whom the sender boards expect to establish communication as to the memory locations of the respective processor queues and acknowledgment cells.

16. A method for containing faults on a VME backplane bus having a plurality of VME boards connected to the VMEbus and each having a memory, the method comprising the step of:

integrating a message passing mechanism into the VME board memories which validates inter-processor communication on the VMEbus and prevents the propagation of faults from one VME board to another, and wherein said step of integrating a message passing mechanism for inter-task communication further comprises the steps of:

creating a message queue for each task to receive messages;

calling an inter task communication (ITC) service to route messages to be sent from one task to another;

sending the message from the first task to the ITC service; and inserting the sent message at the ITC into a designated receiver task message queue.

17. A method for partitioning a multi-processor VME backplane bus to contain faults within the VME boards connected to the bus, each board having a memory, the method comprising the steps of:

integrating a message passing mechanism into the VMEbus which utilizes memory sharing between VME boards for validating inter-board data transfer and eliminating fault propagation from one VME board to another, the integration further comprising the steps of:

dedicating a portion of memory in each VME board as a read only global buffer for all other VME boards connected to the VME bus; and writing by each board into its global buffer memory address information relating to the location of the global buffers of the other VME boards for use in inter-processor communication activities.

18. A method for partitioning a multi-processor VMF backplane bus to contain faults within the VME boards connected to the bus, each board having a memory, the method comprising the steps of:

integrating a message passing mechanism into the VMEbus which utilizes memory sharing between VME boards for validating inter-board data transfer and eliminating fault propagation from one VME board to another, the integration comprising the steps of:

dedicating a portion of memory in each VME board as a read only global buffer for all other VME boards connected to the VMEbus; and configuring each global buffer memory with address information relating to the location of the global buffers of the other VME boards for use in inter-processor communication activities; and wherein said step of configuring comprises the steps of allocating a processor queue in the global buffer of each board for each receiver board it expects to communicate with, the processor queue being accessible only by its dedicated receiver board;

allocating an acknowledgment cell in the global buffer of each board for each sender board it expects to communicate with, the acknowledgment board being accessible only by its dedicated sender board;

formatting a message to be sent to a task on another VME board;

sending the message to the another VME board;

acknowledging the safe receipt of the sent message; and receiving a sent message at the intended receiver board.

19. The method according to claim 18, wherein said step of sending the message further comprises the steps of:

placing the message to be sent in the processor queue dedicated to the receiver board;

notifying the receiving board that a message is in its processor queue; and resetting a timeout clock for obtaining the acknowledgment of safe receipt of the sent message from the receiver board.

20. The method according to claim 18, wherein said step of acknowledging the safe receipt of message further comprises the steps of:

reading the sender's dedicated acknowledgment cell within the receiver board; and removing the message from the receiver processor queue within the sender board when an acknowledgment has been detected.

21. The method according to claim 18, wherein the step of receiving a sent message further comprises the steps of:

checking the contents of a location monitor on the receiver board;

reading the next value in the location monitor when it is not empty;

retrieving the message from the receiver's processor queue on the sender board;

determining if the message retrieved is valid; and placing an acknowledgment within the sender's dedicated acknowledgment cell on the receiver board when a valid message is retrieved.

* * * * *